No. 636,008. Patented Oct. 31, 1899.
A. SHAW.
METALLIC PACKING.
(Application filed Apr. 15, 1899.)

(No Model.)

WITNESSES
A. Y. Bayles
Herbert Barker

INVENTOR
Alexander Shaw.
BY
Garry P. Van Wye.
ATTORNEY

THE NORRIS PETERS CO., PHOTO-LITHO., WASHINGTON, D. C.

UNITED STATES PATENT OFFICE.

ALEXANDER SHAW, OF JERSEY CITY, NEW JERSEY.

METALLIC PACKING.

SPECIFICATION forming part of Letters Patent No. 636,008, dated October 31, 1899.

Application filed April 15, 1899. Serial No. 713,154. (No model.)

*To all whom it may concern:*

Be it known that I, ALEXANDER SHAW, a citizen of the United States, residing at Jersey City, in the county of Hudson and State of New Jersey, have invented a new and useful Metallic Packing, of which the following is a specification.

This invention relates to packing for piston-rods and valve-stems, and has for its object to provide a packing which is at all times visible, so that any leak can be easily discovered and stopped, another object being to provide a packing which can be easily repaired or replaced.

I attain the objects of my invention by the mechanism illustrated in the accompanying drawings, in which—

Figure 1:
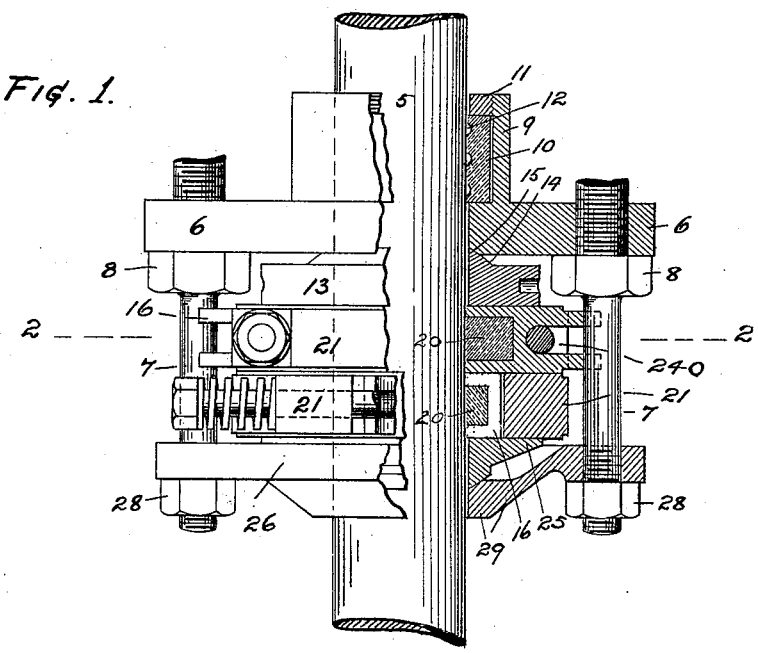
Figure 2:
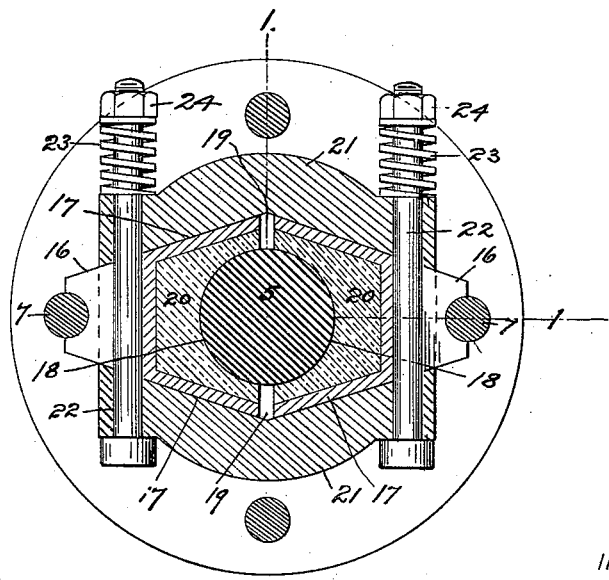

Figure 1 is a plan view of my improved packing mounted upon the piston-rod of an engine, part being shown in section on the line 1 1 of Fig. 2; and Fig. 2 is a sectional view on the line 2 2 of Fig. 1.

Similar numerals refer to the same parts in each of the views.

In the drawings a section of the piston-rod of a steam-engine is indicated by 5, on which is mounted a plate 6, which is secured to the steam-chest of the engine (not shown) by means of the bolts or studs 7, as will be readily understood, the nuts 8 serving to securely hold the plate 6 in place. The plate 6 is provided with an annular flange 9, and held within the flange 9 is an annular ring 10, which is held in place by the clamping-collar 11, and the flange 9 passes into the annular opening in the steam-chest, (not shown,) but in a manner which will be readily understood, and the inner wall of the ring 10 may be provided with annular recesses 12 and is so constructed that it will serve as a packing-ring on the piston-rod 5.

Mounted on the piston-rod 5 and exposed to view is an annular plate or washer 13, which is provided centrally of one side with a semispherical projection 14, and the plate 6 is provided with a corresponding recess 15, and the plates 6 and 13 are provided with circular openings, which pass centrally through said projection and recess, each of which openings is a little greater in diameter than the diameter of the piston-rod which passes therethrough, and the projection 14 fits closely in the recess 15 when the plates are drawn together.

Mounted on the piston-rod 5, adjacent to the plate 13, are two of my improved packing devices, which are disposed at right angles to each other, as clearly shown in Fig. 1, the purpose of which will be hereinafter explained; but the construction of each being the same but one will be described, the same being fully illustrated in Fig. 2.

I provide two plates 16, each of which is provided with inclined edges 17, and the larger end of each is provided with a semicircular recess 18, the radii of which correspond with the radii of the piston-rod 5; but the plates are so proportioned in length that when the plates 16 are oppositely disposed upon the piston-rod 5 a small space 19 will be left between the flat portions of the said large ends, as clearly shown in Fig. 2.

The plates 16 are preferably constructed of brass and are provided at the large ends with recesses 20, which are filled with metal suitable for packing purposes, preferably bell-metal.

Mounted upon the plates 16 are two plates 21, the inner edge of each being cut away to form two inclined planes, which correspond with the inclined edges 17 of the plates 16, so that by drawing the plates 21 together the plates 16 will be forced inwardly upon the piston-rod, as will be readily seen from an inspection of Fig. 2. The plates 21 are provided with bores at the ends thereof, through which are passed bolts 22, on the ends of which are mounted springs 23, and a nut 24 serves to bind the plates 21 upon the plates 16 at any tension desired, and the plates 16 are provided with recesses 240 to allow for the adjustment of the plates 16, as will be readily understood. The space 19 is left so that the plates 16 may be adjusted toward the piston-rod when the plates 16 are worn by contact with the piston-rod, and two packing devices are used and are disposed at right angles to each other, so that the spaces 19 left in one set may be closed by the other, as will be readily understood. Mounted on the piston-rod adjacent to said packing devices is another plate 25, which is similar to plate 13, and a plate 26 is mounted adjacent thereto. The plate 26 is provided with bores, through which the bolts 7 pass, and the packing is held together by nuts 28 on the said bolts. The plate 26 is provided with a depressed portion 29, which is made quite thin and of spring metal, so that the said plate will have a spring action. The plate 26 is also provided with a recess to receive the projection on the plate 25, and the said projection and recess correspond to the projection and recess of the plates 6 and 13, so that when in position on the piston-rod the packing is substantially spherical in shape.

The operation is as follows: The packing is bound upon the piston-rod by the bolts 22 and plates 21 in an elastic manner by reason of the springs 23, so that there can be no binding on the said piston-rod. The spring action of the part 29 of the plate 26 will allow for the several parts of the packing and accessories to be bound together in an elastic manner, so that when the steam-pressure in the engine becomes too great the packing will be sprung free from the engine or steam-chest thereof sufficiently to allow for the escape of the steam, thus acting as a pop-valve, which is a very valuable feature for engines which are small, so that an ordinary pop-valve is not used. It will also be seen that the parts may be taken off and new ones replaced without disturbing the engine at all by reason of this construction, and the parts may be adjusted as worn, so that a great deal of wear can be secured from packing constructed in this manner before the same has to be discarded.

I do not limit myself to the material, as it might occur that other material than what has been described might be used to good advantage in certain cases. Neither do I limit myself to the exact arrangement and construction of parts, for many changes can be made without departing from the spirit of my invention, such as placing springs on the ends of the bolts 7 similar to the springs 23 on the bolts 22 instead of using the spring part 29 of the plate 26, and I therefore reserve all rights to make any change which may fairly come within the scope of my invention.

Having thus described my invention, what I claim, and desire to secure by Letters Patent, is—

1. A metallic packing for engines and valve-stems, comprising a plate provided with a semispherical projection on one side which engages with a similarly-shaped recess in a plate secured to the cylinder-head or valve-chest around the piston-rod, or valve-stem, two packing-rings adjustably and elastically held together and provided with internal recesses filled with packing metal, a plate mounted on said rod or stem adjacent to said rings, and provided on the outer side with a semispherical projection similar to the projection on said first plate, a third plate mounted adjacent thereto and provided with a semispherical cavity adapted to engage said projection, said parts being elastically secured to the cylinder or valve-chest, substantially as and for the purpose set forth.

2. The herein-described metallic packing for engines, comprising bolts 7, plate 6, packing-ring 10, two packing-rings disposed at right angles to each other, and elastically and adjustably mounted upon the piston-rod, a plate 25, and spring-plate 26, substantially as and for the purpose set forth.

In testimony that I claim the above I have hereto affixed my signature.

ALEXANDER SHAW.

Witnesses:
  A. G. RUGLES,
  HERBERT BARKER.